United States Patent [19]
Kim

[11] Patent Number: 5,847,873
[45] Date of Patent: Dec. 8, 1998

[54] MIRROR ASSEMBLY HAVING A STEAMING UP PREVENTING SYSTEM

[76] Inventor: Bok Lae Kim, 503-1204 Sinhwa Apt., Jeongja-dong, Boondang-ku, Seongnam-city, Kyunggi-do, Rep. of Korea

[21] Appl. No.: 838,561

[22] Filed: Apr. 9, 1997

[51] Int. Cl.[6] .................................................. G02B 5/08
[52] U.S. Cl. ......................... 359/512; 359/507; 359/509
[58] Field of Search .................................. 359/507, 509, 359/512

[56] References Cited

U.S. PATENT DOCUMENTS

| | | | |
|---|---|---|---|
| 3,594,063 | 7/1971 | Smillie, III | 359/512 |
| 4,556,298 | 12/1985 | Gottlieb | 359/512 |
| 4,557,003 | 12/1985 | Jones | 359/512 |
| 4,836,668 | 6/1989 | Christianson | 359/512 |

FOREIGN PATENT DOCUMENTS 52-32753  12/1977  Japan .................................... 359/512

*Primary Examiner*—Thong Nguyen
*Attorney, Agent, or Firm*—Ladas & Parry

[57] ABSTRACT

A mirror assembly includes a mirror and a device for preventing said mirror from being steamed up by circulating hot water through a back side of the mirror, the hot water flowing along a hot water supply tube when using hot water in a bathroom. The device has a frame for supporting the mirror at the back side of the mirror and a pipe disposed in the frame, the pipe having inlet and outlet ports connected to downstream and upstream sides, respectively of the hot-water supply tube, respectively, so that part of the hot water can be introduced into the pipe and returned to the hot water supply tube after being circulated therein.

6 Claims, 7 Drawing Sheets

MIRROR ASSEMBLY HAVING A STEAMING UP PREVENTING SYSTEM

BACKGROUND OF THE INVENTION

1. Field of the Invention

The present invention relates to a mirror assembly having a steaming up preventing system and, more particularly, to a mirror assembly which has a steaming up preventing system which can prevent a bathroom mirror from being steamed up when using hot water.

2. Description of the Prior Art

When using hot water in a bathroom, it is very common to have the surface of a bathroom mirror cleaned to get rid of the steam thereon generated from the temperature difference between the mirror and the bathroom. That is, steam is generated from hot water normally used at a temperature range from about 25° C. to 45° C. As this steam heats the bathroom interior, there will be a temperature difference of about 15°–20 ° C. between the bathroom and the mirror whereby the surface of the mirror is steamed up such that the mirror can no longer reflect an image unless it is cleaned.

A steaming up preventing system using a heat wire, as used for automotive glass, is known. The wire is attached on a rear surface of the mirror to prevent the mirror from being steamed up.

However, such a steaming up preventing system using a heat wire has following problems:

(a) Since the system is usually designed to operate when a light switch of the bathroom is turned on, electric power is consumed regardless of whether hot water is being used. As a result, energy is wasted when the steaming up preventing system is not required.

(b) Since the heat wire is displaced in a humid area between the tile wall and the mirror, a short circuit may happen.

(c) Since the expected life span of the heat wire is short, relative to that of the mirror, the heat wire or the entire mirror must be replaced. The former is troublesome and the latter is costly.

SUMMARY OF THE INVENTION

Therefore, the present invention has been made in an effort to solve the above described problems of the prior art.

It is an object of the present invention to provide a mirror assembly having a steaming up preventing system which is automatically engaged when a shower head is being used such that hot water is utilized to remove steam that is steamed up on a mirror.

It is another object of the present invention to provide a steaming up preventing system of a mirror in which the use of electric power is eliminated.

To achieve the above objects, the present invention provides a mirror assembly comprising a mirror and means for preventing said mirror from being steamed up by circulating hot water through a back side of the mirror, the hot water flowing along a hot water supply tube when using hot water in a bathroom.

According to an embodiment of the present invention, the means comprises a frame for supporting said mirror at the back side of the mirror and a pipe disposed in the frame, said pipe having inlet and outlet ports connected to downstream and upstream sides, respectively of the hot-water supply tube, so that part of the hot water can be introduced into the pipe and returned to the hot water supply tube after being circulated therein.

Preferably, a filler material having substantially high heat transfer characteristic fills the frame so that the pipe can be surrounded by the filler material.

According to another embodiment the present invention, the means comprises a frame for supporting the mirror at the back side of the mirror and a lattice structure provided within the frame, the lattice structure being configured for defining a first hot-water passage connected to the downstream side of the hot-water supply tube through an inlet port and a second hot-water passage communicating with the first hot-water passage, providing a hot-water circulation path, and connected to the upstream side of the hot-water supply tube through an outlet port.

Preferably, the frame is provided with a holder for removably holding a shower head.

Preferably, the hot-water supply tube is provided with an orifice member between the downstream and the upstream so as to prevent a reduction in hot water pressure when water is induced into the pipe or the passages.

According to another aspect, the present invention provides a steaming up preventing system for a mirror comprises a frame for supporting the mirror at the back side of the mirror and means for preventing said mirror from being steamed up by circulating hot water through a back side of the mirror, the hot water flowing along a hot-water supply tube when using hot-water in a bathroom.

BRIEF DESCRIPTION OF THE DRAWINGS

Other features, aspect and advantages of the present invention will be more fully understood when considered with respect to the following detailed description, appended claims, and accompanying drawings where:

DESCRIPTION OF THE PREFERRED EMBODIMENTS

Reference will now be made in detail to the present invention, examples of which are illustrated in the accompanying drawings. Wherever possible, the same reference numbers will be used throughout the drawings to refer to the same or like parts.

Figure 1:
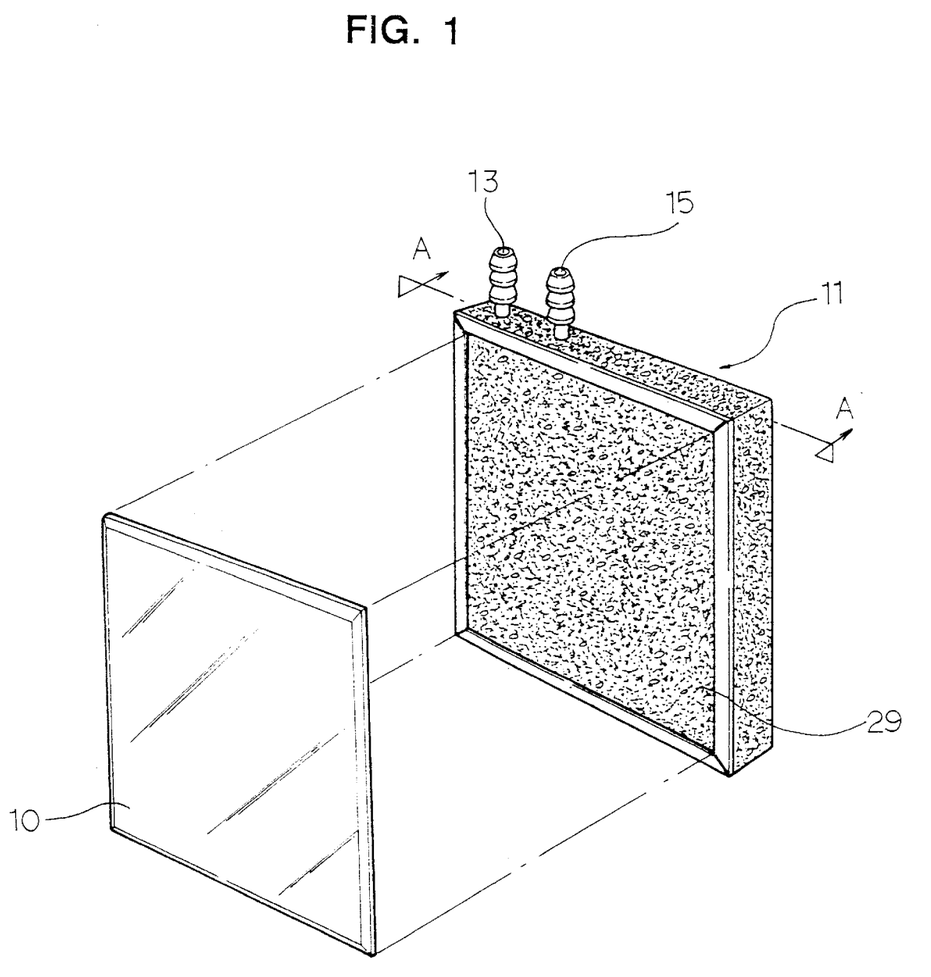
FIG. 1 is a perspective view of a mirror assembly where a steaming up preventing system according to a first embodiment of the present invention is illustrated.
Figure 2:
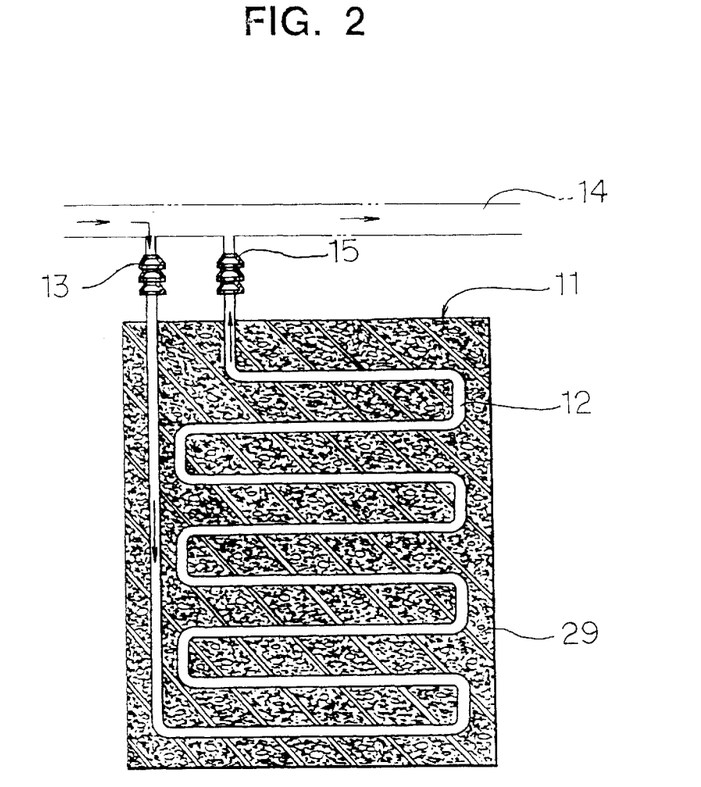
FIG. 2 is a sectional view taken along line 2—2 of FIG. 1.
Figure 3:
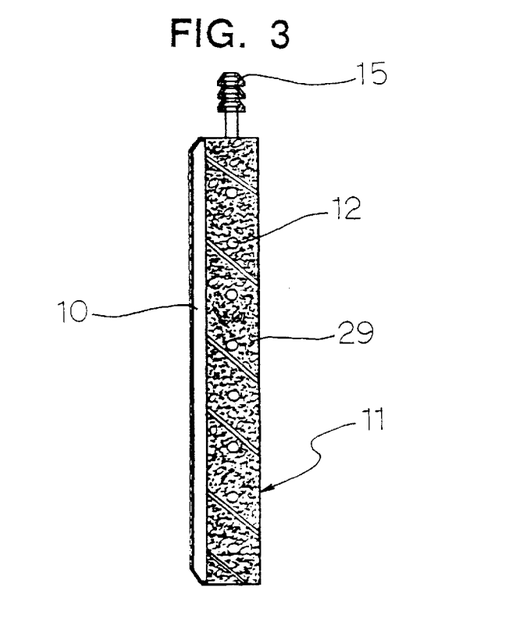
FIG. 3 is a side view of FIG. 2.

Referring first to FIGS. 1 to 3, there are shown views of a mirror assembly according to a first embodiment of the present invention. The mirror assembly 1 comprises a mirror 10, a frame 11 which is attached on a wall of a bathroom to support the mirror 10, and a pipe 12 for removing steam arranged inside the frame 11 for preventing the mirror 10 from being steamed up by steam generated when using hot water. One end of the pipe 12 is branched off from a hot water supply tube 14 so that part of the hot water can be directed thereto, and the other end of the pipe 12 is connected to the water supply pipe 14 so that the hot water introduced into pipe 12 can be returned to the hot water supply tube 14 after being circulated.

That is, the pipe 12 is provided with an inlet port 13 connected to a downstream side of the hot water supply tube 14, through which part of the hot water flowing along the hot-water supply tube 14 is fed into the pipe 12, and an outlet port 15 connected to an upstream side of the hot water supply tube 14 through which the hot water returned to supply tube 14. As a result, hot-water flows in through the inlet port 13, circulates through the anti-fog pipe 12, then flows outward into the hot water supply tube 14. Filler material 29, having substantially high heat transfer characteristics, is filled in the frame so that the pipe 12 can be surrounded by the filler material 29.

Figure 4:
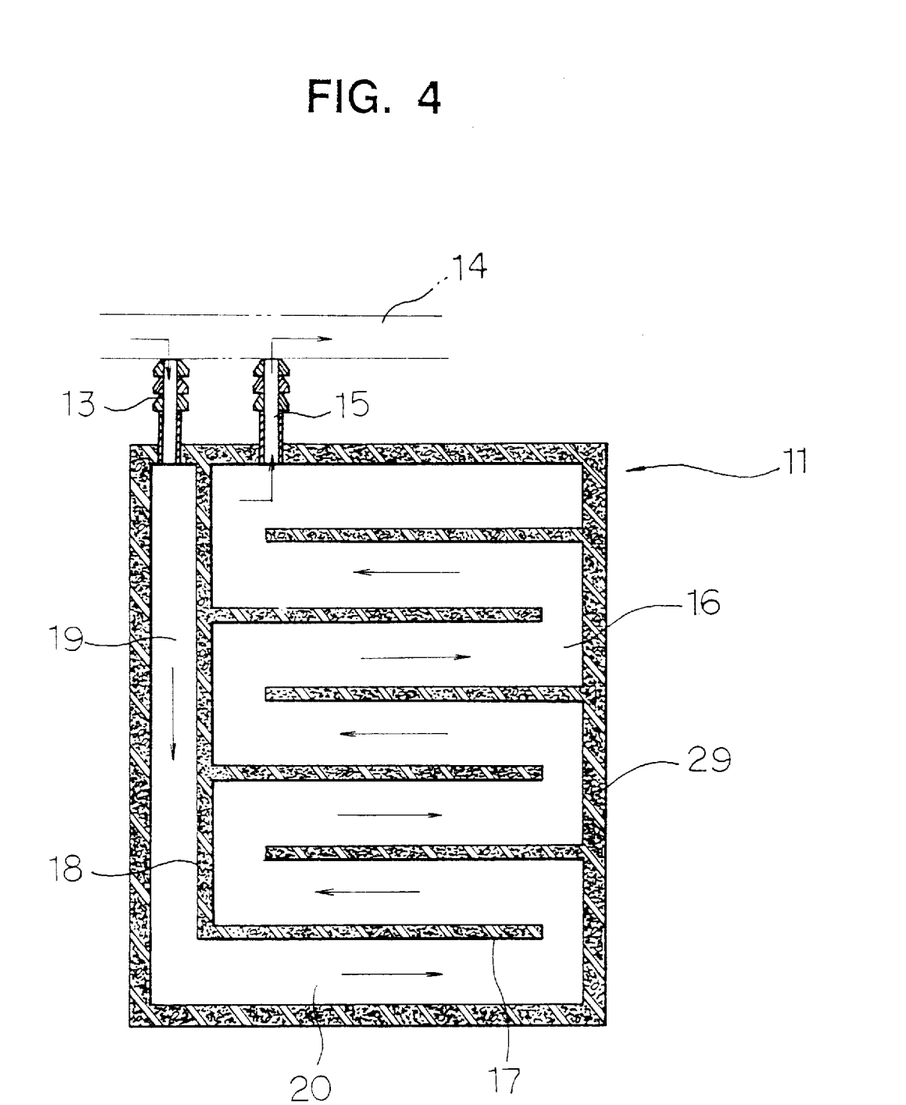
FIG. 4 is a perspective view of a mirror assembly where a steaming up preventing system according to a second embodiment of the present invention is illustrated.

According to a second embodiment shown in FIG. 4, instead of the pipe 12 of the first embodiment, a lattice structure 17 is provided within the frame. The lattice structure 17 is configured to define a first hot-water passage 19, connected to the inlet port 13, and a second hot-water passage 20 communicating with the first hot-water passage 19, providing a hot-water circulation path, and connected to the outlet port 15. Also, filler material 29 fills the lattice structure 17 such that the heat of the hot water is transmitted to the mirror 10, thereby preventing the mirror 10 from being steamed up.

In the above described embodiments, the frame having the pipe or hot water passages can be installed in the bath room wall when building the house.

Figure 5A:
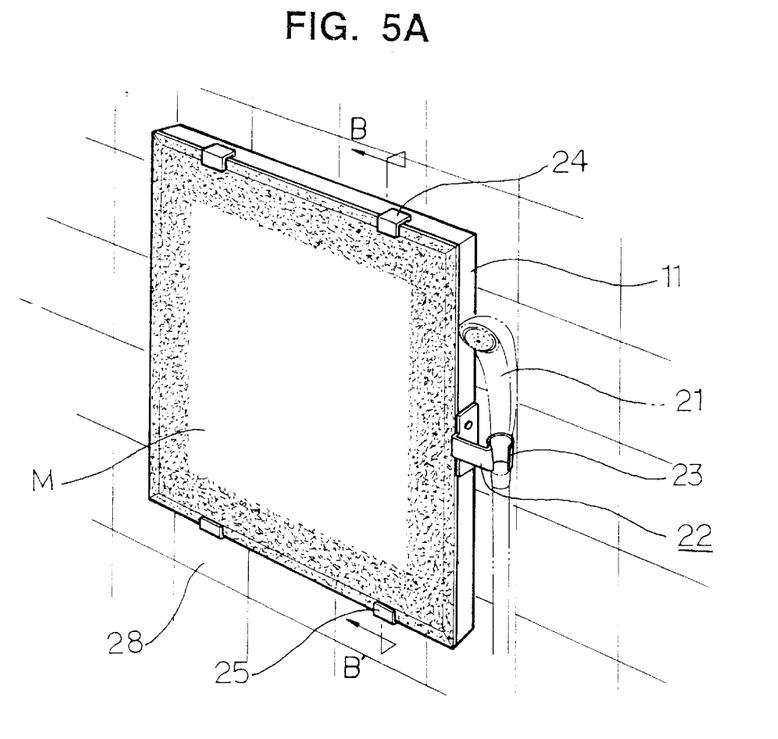
FIG. 5A is a perspective view of a mirror assembly where a steaming up preventing system according to a third embodiment of the present invention is illustrated
Figure 5B:
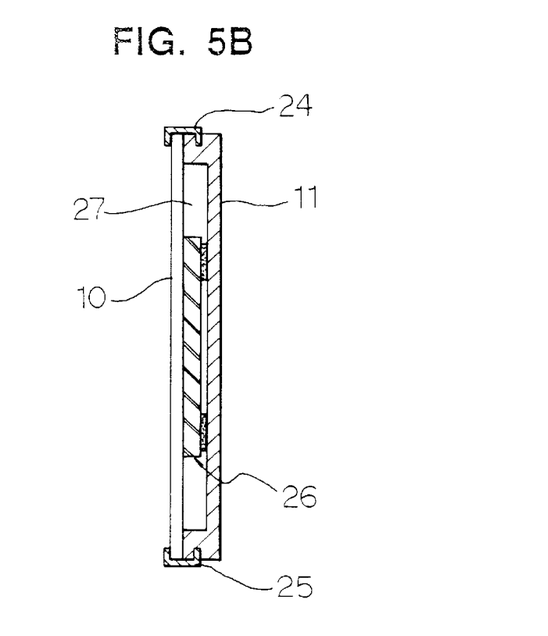
FIG. 5B is a sectional view taken along line 5—5 of FIG. 5A.

Referring to FIGS. 5A and 5b, there are shown respectively a perspective view and a sectional view of a mirror assembly having a steaming up preventing system according to a third embodiment of the present invention. In this embodiment, the frame 11 is fixed on a tile wall 28 supporting the mirror 10. A gap 27 is defined between the mirror 10 and the frame 11. A hot-water panel 26 is disposed in the gap 27. The hot-water panel 26 prevents the mirror 10 from being steamed up by supplying hot water circulating in a path after the hot water introduced from the hot water supply tube (not shown). The hot-water panel 26 is also provided with a pipe or a hot water passage which is connected to the hot water supply tube(not shown). The mirror 10 is secured to the frame 11 by a plurality of clips 24 and 25 which are fixed on upper and lower edges of the frame 11.

Further, a shower head 21 is removably hung on a seating portion 23 of a holder 22 formed on a side wall of the frame 11.

This embodiment is suitable for mounting the mirror assembly to the bath room wall which is already built.

Figure 6:
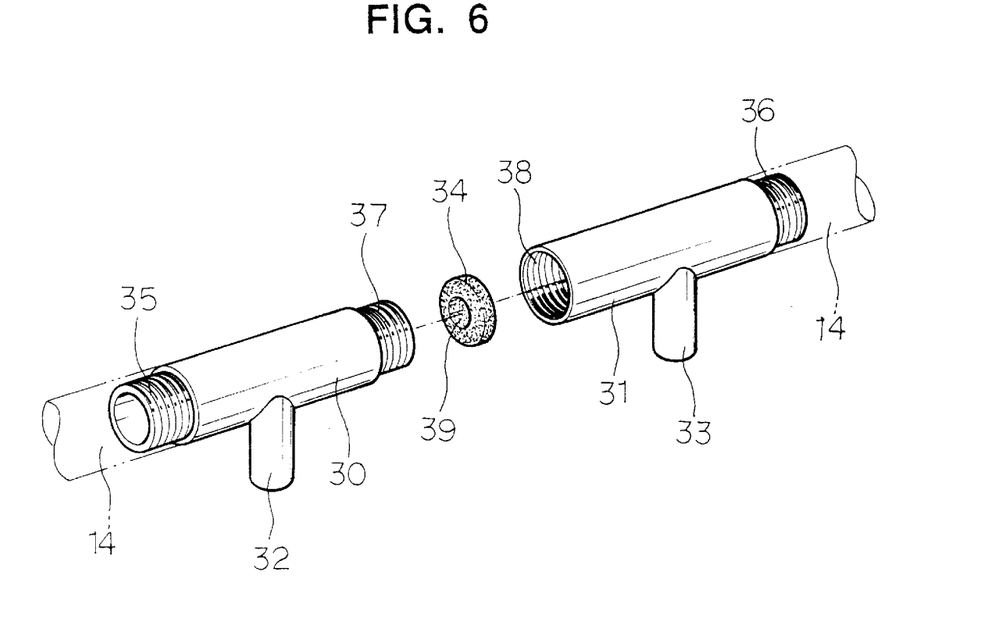
FIG. 6 is an exploded perspective view of a hot-water connector used in a steaming up preventing system according to the present invention.
Figure 7:
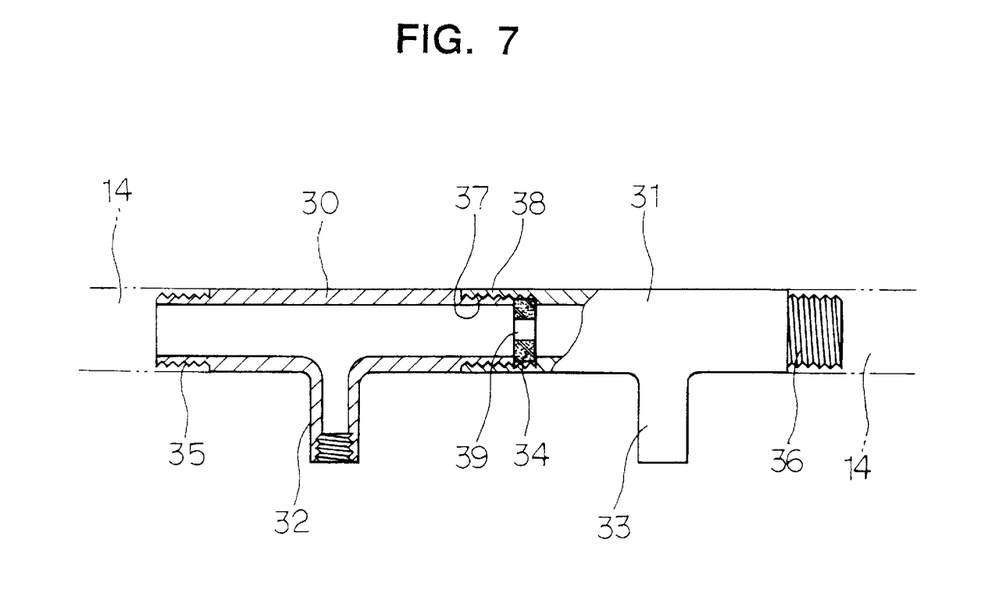
FIG. 7 is an assembled partial sectional view of FIG. 6.
Figure 8:
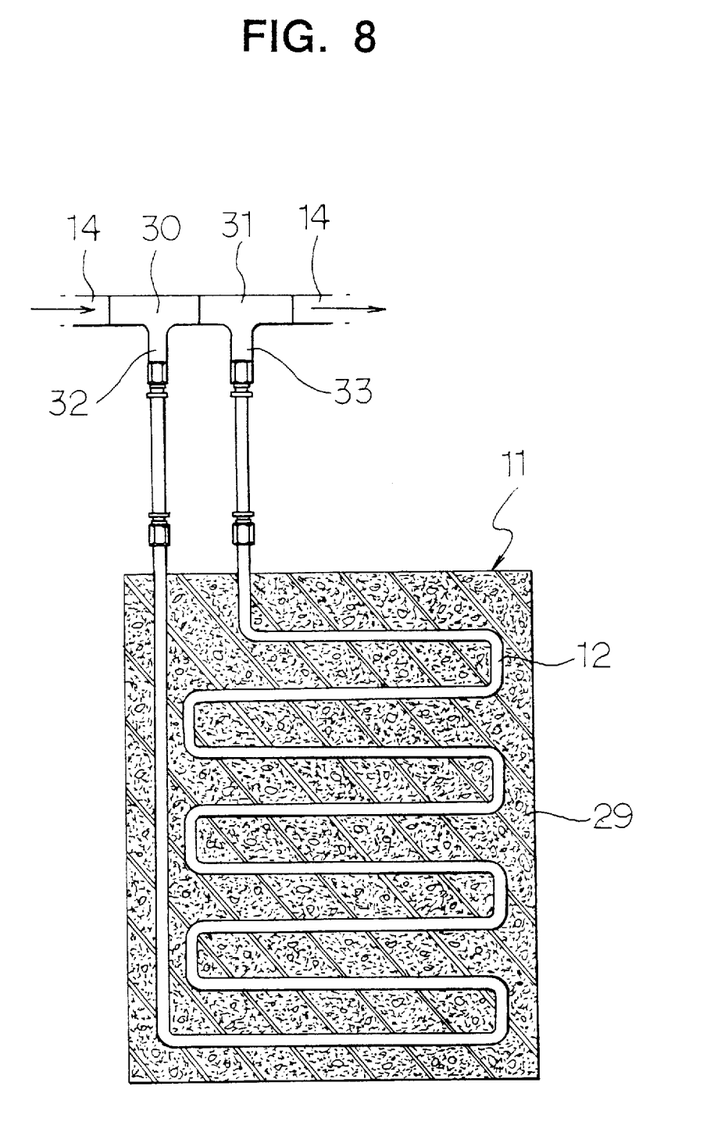
FIG. 8 is a view illustrating an operating state of a hot-water connector of a steaming up preventing system according to the present invention.

Referring to FIGS. 6 to 8, there are shown views illustrating an embodiment of a hot water connecting structure 3 for connecting the hot-water supply tube 14 to the pipe 12. This structure 3 comprises first and second hot-water connectors 30 and 31 having branch tubes 32 and 33, respectively. The first hot-water connector 30 is at its opposite ends provided with an outer male thread portion 35 and an outer male thread portion 37, respectively. The second hot-water connector 31 is provided with an inner female thread portion 38 at one end and is provided with an outer male thread portion 36 at the other end. The outer male thread portion 37 of the first hot-water connector 30 is thread-coupled to the inner female thread portion 38 of the second hot-water connector 31 while interposing an orifice member 34 therebetween. Further, the outer male thread portion 35 of the first hot-water connector 30 is thread-coupled to a downstream side of the hot-water supply tube 14, and the outer male thread portion 36 of the second hot-water connector 31 is thread-coupled to the upsteam side of the hot-water supply tube 14 such that the upstream and downstream sides of the hot-water supply tube 14 communicate with each other through a relatively small hole 39 formed in the orifice member 34. The branch tubes 32 and 33, respectively branched off from the first and second connectors 30 and 31, are respectively connected to inlet and outlet ports of the pipe 12.

In the above, the orifice member 34 having the small hole 39 between the connectors 30 and 31 is provided to prevent a reduction in water pressure that would otherwise result from part of the hot water being introduced into the inlet of the pipe 12 through the branch tube 32 of the first connector 30.

Figure 9:
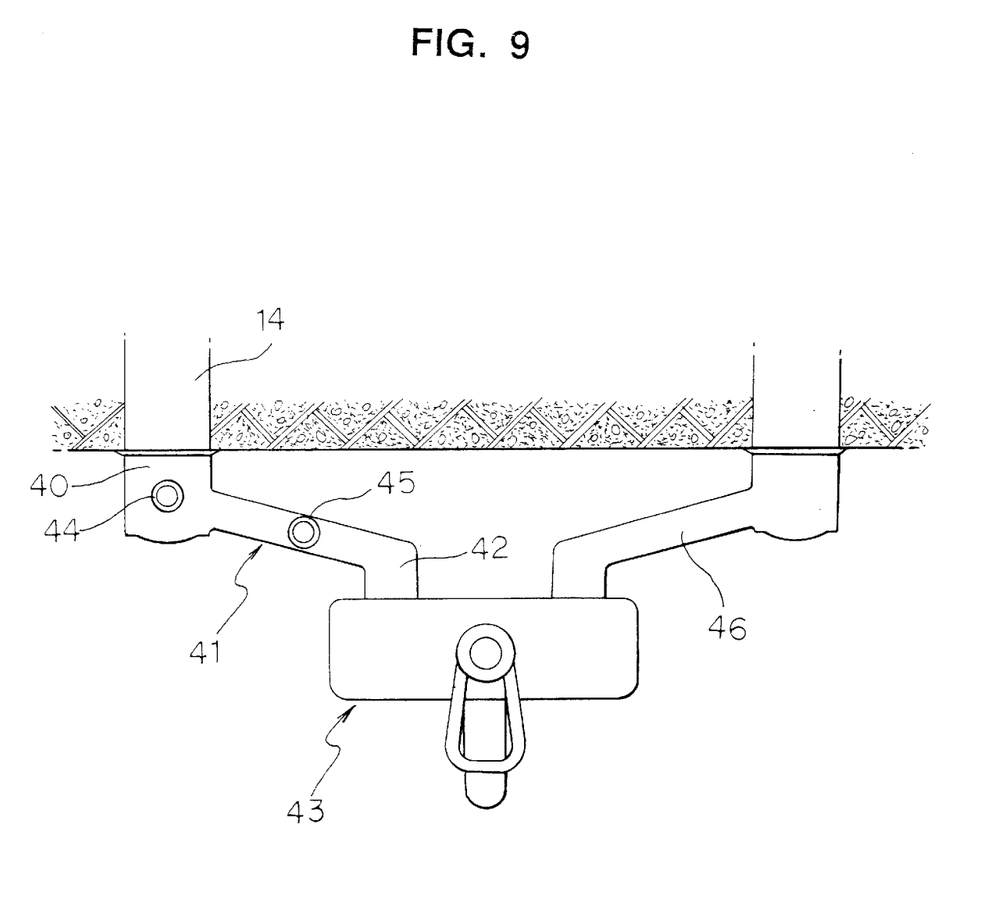
FIG. 9 is a perspective view of a middle connecting member used in a steaming up preventing system according to the present invention.

Referring to FIG. 9, there is shown a middle connecting member which can be used when installing a mirror assembly of the present invention on a wall of a building having the hot-water supply tube 14 already installed therein.

An inlet end 40 of middle connecting member 41 is connected to the pre-mounted hot-water supply tube 14 and an outlet end 42 of middle connecting member 41 is connected to a cold-hot-water regulating member 43. Branch ports 44 and 45 which are to be connected to the inlet and outlet ports of the pipe of the hot water passage are formed on the middle connecting member 41.

The operation of the mirror assembly having the steaming up preventing system will be described hereinafter.

When using hot water for showers or other purposes, the hot water is directed from the hot-water supply tube 14 to the cool-hot regulating member 43 and is mixed with cold water directed from the cold water supply tube 46 then through the shower head 21.

At this point, part of the hot water flowing along the hot-water supply tube 14 is fed to the pipe 12 through the inlet port 13. The fed hot water circulates through the pipe 12 and is returned to the hot-water supply tube 14. By this operation, the back face of the mirror 10 is heated, thereby preventing the mirror from being steamed up. That is, a certain area A of the whole area of the mirror 10 is prevented from being steamed up(see FIG. 5A).

In addition, as described above, the pressure reduction of hot-water which is fed to the cold-hot-water regulating member 43, generated by part of the hot-water which is introduced from the hot-water supply tube 14 to the pipe 12 through the input port 13, can be prevented since pressure compensation is realized by the relatively small hole 39 formed in the orifice member 34 which is disposed between the hot-water connectors 30 and 31 (see FIG. 7).

As described above, the steaming up preventing system of the present invention can be operated without the use of electricity and is automatically activated with the use of the shower head. As a result, energy is saved and the possibility of parts (i.e., a heat wire) becoming defective is avoided.

Various details of the invention may be changed without departing from its spirit not its scope. Furthermore, the foregoing description of the embodiments according to the present invention is provided for the purpose of illustration only, and not for the purpose of limiting the invention as defined by the appended claims and their equivalents.

What is claimed is:

1. A mirror assembly comprising:

a mirror; and means for preventing said mirror from being steamed up by circulating hot water through a back side of the mirror, the hot water flowing along a hot water supply tube when using hot water in a bathroom; wherein said means comprises:
- a frame for supporting said mirror at the back side of the mirror;
- a pipe disposed in the frame, said pipe having inlet and outlet ports connected to downstream and upstream sides, respectively of the hot-water supply tube, so that part of the hot water can be introduced into the pipe and returned to the hot water supply tube after being circulated therethrough;
- first and second connectors connected to respective upstream and downstream sides of the hot-water supply tube, each connector having a branch tube connected to said inlet port and said outlet port, respectively of said pipe; and
- an orifice member disposed between said first and second connectors.

2. A mirror assembly according to claim 1, wherein a filler material having substantially high heat transfer characteristic fills the frame so that the pipe is surrounded by the filler material.

3. A mirror assembly according to claim 1, wherein the frame is provided with a holder for removably holding a shower head.

4. A mirror assembly comprising:

a mirror; and means for preventing said mirror from being steamed up by circulating hot water through a back side of the mirror, the hot water flowing along a hot water supply tube when using hot water in a bathroom; wherein said means comprises:
- a frame for supporting said mirror at the back side of the mirror;
- a lattice structure provided within the frame, the lattice structure being configured so as to define a first hot-water passage connected to a downstream side of the hot-water supply tube through an inlet port and a second hot-water passage communicating with the first hot-water passage, providing a hot-water circulation path, said second hot-water passage being connected to an upstream side of the hot-water supply tube through an outlet port;
- first and second connectors connected to respective upstream and downstream sides of the hot-water supply tube, each connector having a branch tube connected to said inlet port and said outlet port, respectively of said pipe; and
- an orifice member disposed between said first and second connectors.

5. A mirror assembly according to claim 4, wherein a filler material having substantially high heat transfer characteristic fills the frame so that the pipe is surrounded by the filler material.

6. A mirror assembly according to claim 4, wherein the frame is provided with a holder for removably holding a shower head.

* * * * *

UNITED STATES PATENT AND TRADEMARK OFFICE
CERTIFICATE OF CORRECTION

PATENT NO. : 5847873
DATED : December 8, 1998
INVENTOR(S) : Bok Lae KIM

Page 1 of 5

It is certified that error appears in the above-identified patent and that said Letters Patent is hereby corrected as shown below:

substitute the attached Figures 1, 4, 5A, 5B and 6, for figures 1, 4, 5A, 5B and 6

Signed and Sealed this

Eighth Day of May, 2001

Attest:

NICHOLAS P. GODICI

Attesting Officer     Acting Director of the United States Patent and Trademark Office